United States Patent [19]

Larsen et al.

[11] Patent Number: 4,903,683

[45] Date of Patent: Feb. 27, 1990

[54] APPARATUS AND METHOD FOR DUTCH OVEN COOKING OVER CHARCOAL

[76] Inventors: Darwin W. Larsen, 46 W. 1st North, Logan, Utah 84321; Jack C. Thompson, 75 W. Center, Providence, Utah 84332

[21] Appl. No.: 253,164

[22] Filed: Oct. 3, 1988

[51] Int. Cl.⁴ .......................... A47J 37/00; F24B 3/00
[52] U.S. Cl. .................. 126/25 B; 126/41 R; 126/305; 248/165; 108/156; 108/159; 294/10; 294/12
[58] Field of Search .................. 126/25 R, 25 A, 9 R, 126/9 B, 39 R, 41 R, 25 B, 304 R, 304 A, 305; 294/10, 12, 26, 6; 108/153, 156, 159; 99/449, 450; 248/165

[56] References Cited

U.S. PATENT DOCUMENTS

| | | | |
|---|---|---|---|
| 163,659 | 5/1875 | Hoyt | 294/10 |
| 554,150 | 2/1896 | Smith | 294/12 |
| 627,668 | 6/1899 | Holt | 294/10 |
| 3,068,852 | 12/1962 | Purtzer | 126/9 R |
| 3,339,505 | 9/1967 | Bean | 126/25 B |
| 3,765,397 | 10/1973 | Henderson | 126/25 B |
| 4,133,335 | 1/1979 | Malafouris | 126/25 B |
| 4,222,599 | 9/1980 | Gale et al. | 294/12 |
| 4,227,510 | 10/1980 | Frazier et al. | 126/25 B |
| 4,328,783 | 5/1982 | Martenson | 126/25 R |
| 4,510,916 | 4/1985 | Ogden | 126/25 R |
| 4,624,238 | 11/1986 | Hait | 126/305 |

*Primary Examiner*—James C. Yeung
*Attorney, Agent, or Firm*—Lynn G. Foster

[57] ABSTRACT

A system, including apparatus and methods, which facilitates the use of dutch ovens, usually combined with a charcoal heating source, in outdoor cooking. The first apparatus is a safe, independent, time-efficient device which quickly preheats charcoal briquettes contained in a portable hopper, accomplishing the same by means of a self-contained, transportable, propane-fueled burner. A second apparatus is a sturdy, portable cooking stand, which, in the "as used" position, provides a safe, elevated site whereupon the charcoal heating source and a plurality of dutch ovens can be conveniently placed for cooking purposes, and which, in the "as transported" position, is disassembled and may be carried facilely to more desired locations. The third apparatus is a T-handled dutch oven and dutch oven lid lifting device whereby said ovens and/or lids may be conveniently and safely removed from and replaced on the heating source.

24 Claims, 4 Drawing Sheets

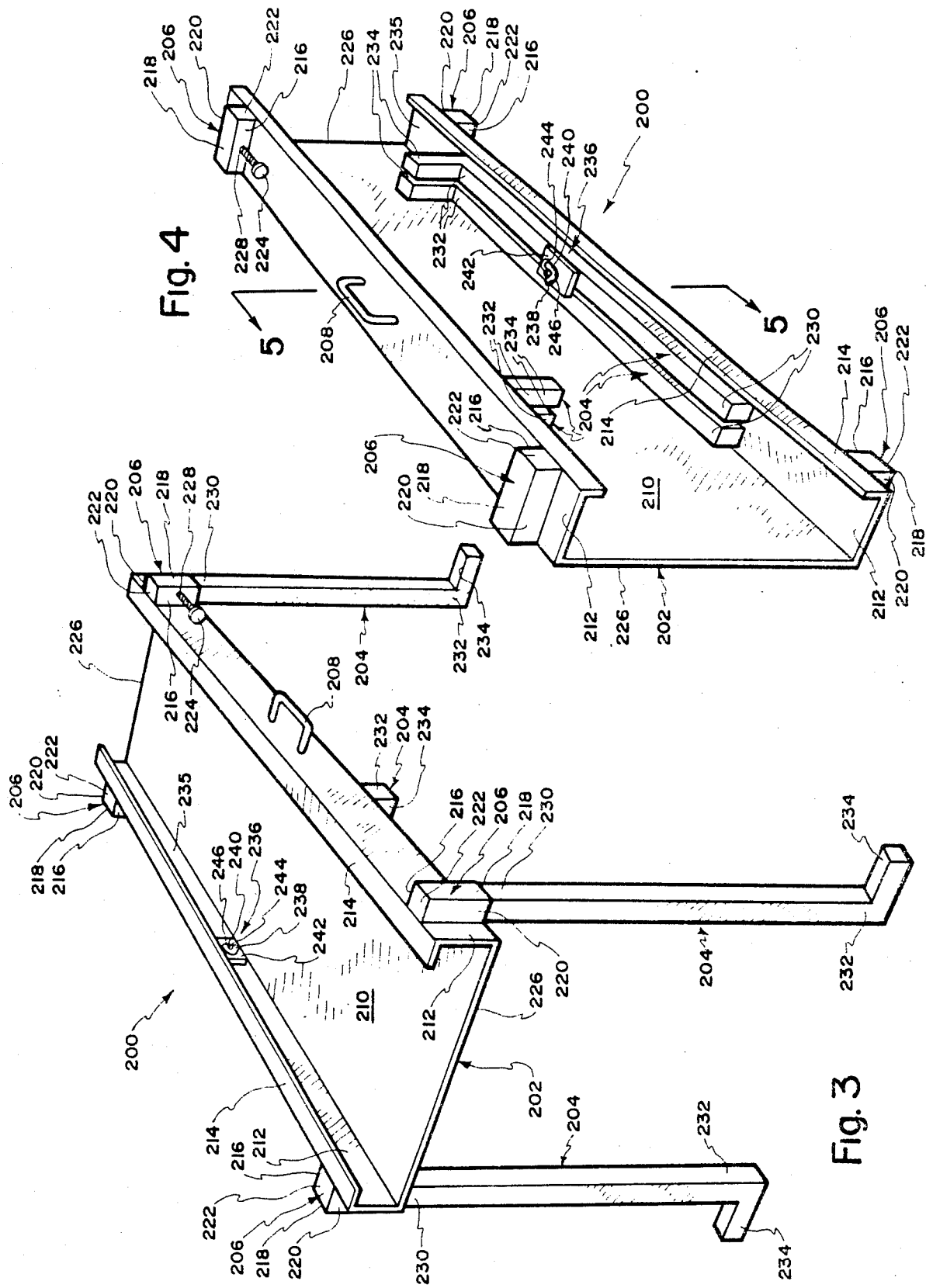

APPARATUS AND METHOD FOR DUTCH OVEN COOKING OVER CHARCOAL

FIELD OF THE INVENTION

The present invention relates generally to outdoor cooking and more particularly to a system, including apparatus and method, which facilitates convenient dutch oven cooking with charcoal by providing a quickly prepared economical charcoal heat source, a safe portable cooking stand, and a combination oven/lid lifting device.

PRIOR ART

There are many known prior art methods and devices that enable one to cook using dutch ovens in connection with a charcoal heating source. The first to be examined is the manner in which the charcoal is oxidized for cooking purposes. Perhaps the most common method in use today is the employment of charcoal starter or lighter fluid. This method involves squirting or sprinkling the fluid onto charcoal briquettes and then striking a match to ignite the same. However, the use of lighter fluid has several drawbacks and disadvantages.

First, the storage of lighter fluid, a flammable liquid, increases the danger of accidental fire. Second, vapors exuded from lighter fluid are odorous and harmful to human health and yet cannot be completely avoided by the user. Third, fumes from the burning fluid are also harmful and yet likewise cannot be totally avoided. Fourth, skin contact with lighter fluid is irritating, but difficult to prevent. Fifth, application of the proper amount of fluid to the charcoal briquettes is difficult to judge. If too much is applied, not only can an initial flare-up or explosion result, but also the briquettes may burn too rapidly resulting in burnout of the fluid without adequate ignition of the charcoal. On the other hand, if too little fluid is applied, the charcoal will not ignite at all.

A fairly recent development in the use of lighter fluid, instigated in an attempt to avoid some of the above-mentioned problems, entails soaking the charcoal briquettes with lighter fluid at the point of manufacture or packaging. Thus soaked, the briquettes may be ignited simply by striking a match. But this method also has shortcomings. For example, pre-soaked briquettes emanate an unpleasant odor. Also, if stored for a long period of time, the lighter fluid may tend to dissipate, resulting in decreased effectiveness.

Another problem associated with the use of lighter fluid is the delay involved between the time of igniting the briquettes and the time at which they are heated sufficiently for cooking. This problem may be to some degree alleviated by use of an electric heating element which may be placed in contact with the briquettes and energized. Not only is the electric element method faster than using the lighter fluid, it also has the advantages of eliminating harmful vapors, fumes and skin irritation, as well as obviating the need to store a flammable liquid or estimate the proper amount of lighter fluid. However, the difficulty encountered with the electric element method is that the element requires access to an electric power source, which severely limits the areas where cooking may be accomplished.

The second aspect in dutch oven cooking to be examined is the apparatus used as a heat source in dutch oven cooking. The standard approach is to build a bonfire or to build a fire in a fire bowl. Once the fire has burned down so as to leave only embers remaining, the dutch oven is set directly thereon. This method limits dutch oven cooking for several reasons.

First, a bonfire requires a large space or area. Generally, a conventional yard is not conducive to bonfires not only because of space restrictions, but also because open fires are prohibited in most populated areas. Pollution control is another factor. This holds true for other locations, such as parks and campgrounds as well. In addition, bonfires can cause damage to surrounding plants and leave unsightly messes.

Second, fire bowls are normally formed of clay and consequently have a relatively short life. Not only does the heat from the bonfires quickly break down the structural qualities of the clay, but fire bowls are also highly susceptible to inadvertent breakage due to jarring during transport and storage as well as during cooking. Also, left-over ashes from bonfires must be removed manually, which can prove a difficult task since fire bowls are heavy and awkward to lift. While it is true the ashes may be removed with a shovel or another scooping device, this method is time consuming and physically exhausting.

Another problem with both the bonfires and fire bowl methods is the proximity of the dutch ovens during cooking. With both methods the ovens are located at ground level, which requires the cook to bend or stoop over to obtain access to the oven's contents.

Other cooking devices, such as standard barbecue, devices employing charcoal briquettes as a heat source, are not well-suited for dutch oven cooking for several reasons. First, such devices are usually constructed of lightweight material unable to accommodate the heavy weight of dutch ovens. Second, such cooking devices are either not large enough to accommodate dutch ovens or are not of a configuration so as to sustain the oven in an upright condition. Dutch ovens must stand upright during cooking to avoid spilling the contents.

The third and final aspect to be examined is the manner in which dutch ovens and dutch oven lids are removed and replaced during cooking. While many devices are known in the art for accomplishing this necessary task, most are either devices specifically designed for other applications but instead used in this application only for lack of a better method.

A commonly used device for removing the lid of a dutch oven is a large cooking fork. However, because of the heavy weight of the lid and the awkward position from which the fork must be used, great effort is required to lift the lid at all. If the lid is successfully lifted, ashes often fall from the lid into the food contained in the oven since the lid has a tendency under the circumstances to be unstable and cannot be maintained in a level position. Also, the weight of the lid often causes the tines of the fork to bend, thus rendering the fork unsuitable for its intended use thereafter.

Another device used for removing a dutch oven lid is a common tree branch or other wooden stick. Similar problems of awkwardness and instability associated with use of a fork are encountered here. However, wooden sticks or branches also have a greater tendency to suddenly snap or otherwise break when supporting the lid's great weight. This presents an imminent danger to anyone in the proximity of the oven, but particularly to the person attempting to remove the lid.

Still another common method is the use of a cooking hot pad. But since dutch oven cooking is generally accomplished while the oven is in direct contact with the heating source, i.e. an open fire or hot coals, the chances of receiving a burn while removing the lid are unduly great. In addition, the lid's weight and a general lack of sufficient insulation in a common heating pad can be prohibitive.

A further problem results when one attempts to remove the entire dutch oven assembly from the heat source. The same techniques discussed above used to attempt to remove the lid are also used to attempt to remove the entire oven. And the same limitations and disadvantages discussed above apply in this context, except that the weight of the object to be moved is substantially greater.

In summary, while many methods and devices exist to facilitate dutch oven cooking, several problems persist from use of the same. Lack of adequate solutions to the above-mentioned problems is an ongoing concern.

BRIEF SUMMARY AND OBJECTS OF THE INVENTION

In brief summary, the present invention overcomes or substantially alleviates the aforementioned problems of the prior art by providing a transportable, self-contained, propane charcoal briquette starter unit; a sturdy, portable, C-shaped cooking stand and; and a sturdy, lightweight cooking utensil for removal and replacement of dutch ovens and dutch oven lids from a heating source.

The charcoal starter unit has two preferred forms. The first comprises a propane open flame burner, an open-ended cylindrical hopper to which the propane burner is mounted, a propane storage tank which supplies propane to the burner, and a second cylindrical hopper having a porous bottom into which charcoal briquettes are placed to be preheated by the open flame for use in outdoor cooking and in which the oxidating briquettes are transported from the starter unit to the location where the cooking is to be accomplished. The second cylindrical hopper further comprises handles for ease of transportation and a medium gauge screen comprising the bottom end of the cylinder so that the open flame emanating from the propane burner comes in direct contact with the charcoal briquettes during heating. Allowing direct contact of the flame with the briquettes obviates the need for lighter or starter fluid, and, thus, prior art problems associated with lighter fluid are avoided. In addition, the charcoal starter unit is self-contained and, therefore, may be readily transported to any desired site. Furthermore, use of the present starter unit ignites and preoxidizes the charcoal much faster than the prior art techniques and allows the user to continuously replenish the hot, ready-to-use briquettes, as desired or necessary.

The second presently preferred charcoal starter unit is identical to the first unit in all respects, except that the open flame burner is mounted to a flat frame rather than to a cylindrical hopper. This frame may then be received into the C-shaped tray of the cooking stand which acts as a further support while the preheating process in accomplished. The second cylindrical hopper is placed on top of the cooking stand so as to expose the contained briquettes to the open flame of the burner. This second starter unit has the same advantages as the first, and also has the added advantage of being lighter and more compact than the first unit.

The presently preferred portable cooking stand comprises an open-ended C-channel tray, detachable legs and a handle to facilitate storage and transportation. The tray is supported waist high, in the "as used" position, by the legs with the open side facing upwards. Charcoal briquettes preferably prepared by the mentioned starter unit, or otherwise comprising a suitable heat source comprising hot coals or embers are placed in the tray's channel while dutch oven, or other desired cooking container, is set on or over the heating source. The C-channel tray safely contains the desired heat source and the tray's legs elevate the cooking site to a more comfortable and manageable position for the cook. After completion of the cooking and the charcoal or embers have cooled, the remaining ashes are conveniently placed upon the ground, for extinguishment, or into a receptacle by simply lifting one end of the tray. This action induces the ashes to slide out of the tray through an open end thus obviating the need for extensive manual cleaning. The tray is then disassembled by detaching the legs, stacking them in the tray's channel and preferably connecting them to the channel against inadvertent separation or loss. Thus disassembled, the cooking stand is in the "as stored" or "as transported" position.

The presently preferred cooking utensil comprises a handle at one end of a straight shaft, and at the other end, a heel and toe assembly whereby a dutch oven and the lid therefor can be safely and efficiently lifted onto and from a heat source, as well as a hook with which to engage the bail of a dutch oven, also for lifting purposes. The toe portion of the heel and toe assembly is slipped under the handle of a dutch oven lid until engaged. The heel portion also engages the lid albeit in a supporting or stabilizing capacity. The lid is then lifted either from or onto a dutch oven with decreased chances of dropping the lid or spilling ashes into the oven.

With the foregoing in mind, it is a principal object of the present invention to provide a novel system, including apparatus and methods, which facilitates outdoor cooking, particularly when dutch ovens are used in correlation with a charcoal heating source.

It is a further significant object of the present invention to provide a propane burner and related assembly which preheats charcoal briquettes for use as a heating source in outdoor cooking.

It is a further important object of this invention to provide a charcoal briquette igniting and oxidation apparatus, and related methods, having one or more of the following features and advantages: safe, time efficient, effective, transportable, durable, heat resistant, easy to use and capable of providing a continuous supply of preheated charcoal briquettes over an extended period of time.

It is a further paramount object to provide a cooking stand which facilitates integration of dutch oven cooking with a charcoal heating source.

Another significant object of the present invention is to provide a cooking site, including related methods, possessing one or more of the following features and advantages: sturdy, durable, easily transported, convenient, safe, heat resistant, easily cleaned, capable of containing a charcoal heating source for cooking purposes and capable of simultaneously accommodating a plurality of dutch ovens for cooking purposes.

It is a further principal object to provide a novel portable cooking stand.

Another important object of this invention is to provide an outdoor cooking utensil whereby dutch ovens and dutch oven lids can be safely and facilely placed upon or in and removed from a heating source.

A further paramount object is to provide an outdoor cooking utensil, including related methods, having one or more of the following features and advantages: safe, lightweight, sturdy, durable, easy to use, heat resistant, efficient and convenient.

These and other objects and features of the present invention will be apparent from the detailed description taken with reference to the accompanying drawings.

BRIEF DESCRIPTION OF THE DRAWINGS

FIG. 3 is a perspective view of a dutch oven cooking stand, according to the present invention, in its assembled "as used" position;

FIG. 4 is a top front perspective view of the dutch oven cooking stand of FIG. 3, in its disassembled "as stored" or "as transported" position;

DETAILED DESCRIPTION OF THE ILLUSTRATED EMBODIMENTS

Figure 1:
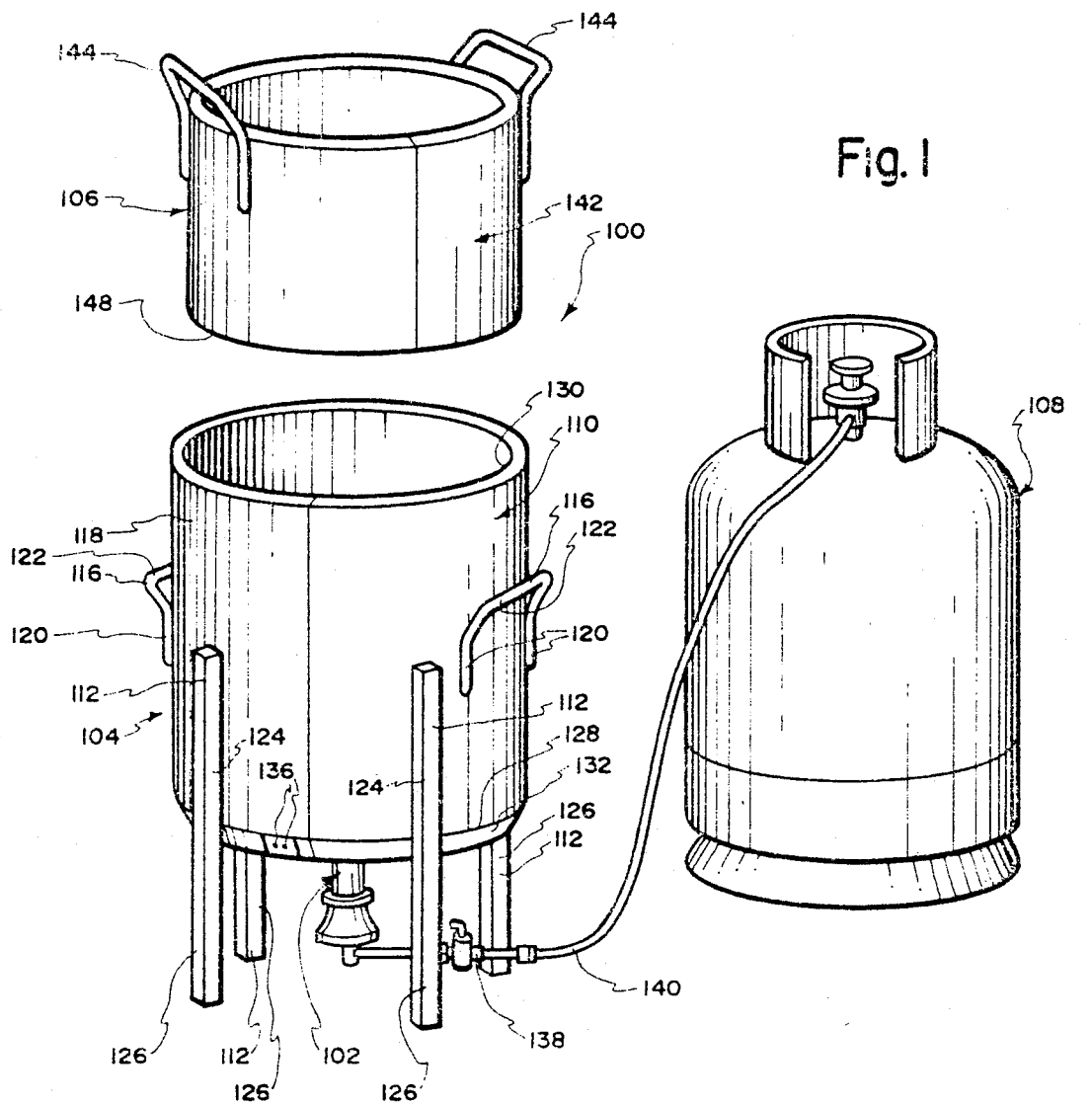
FIG. 1 is a perspective view of a first propane charcoal briquette starter unit, according to the present invention, illustrating a charcoal containing hopper, which inserts into an open top end of a propane burner containing hopper, which in turn is connected to a propane supplying storage tank.
Figure 2:
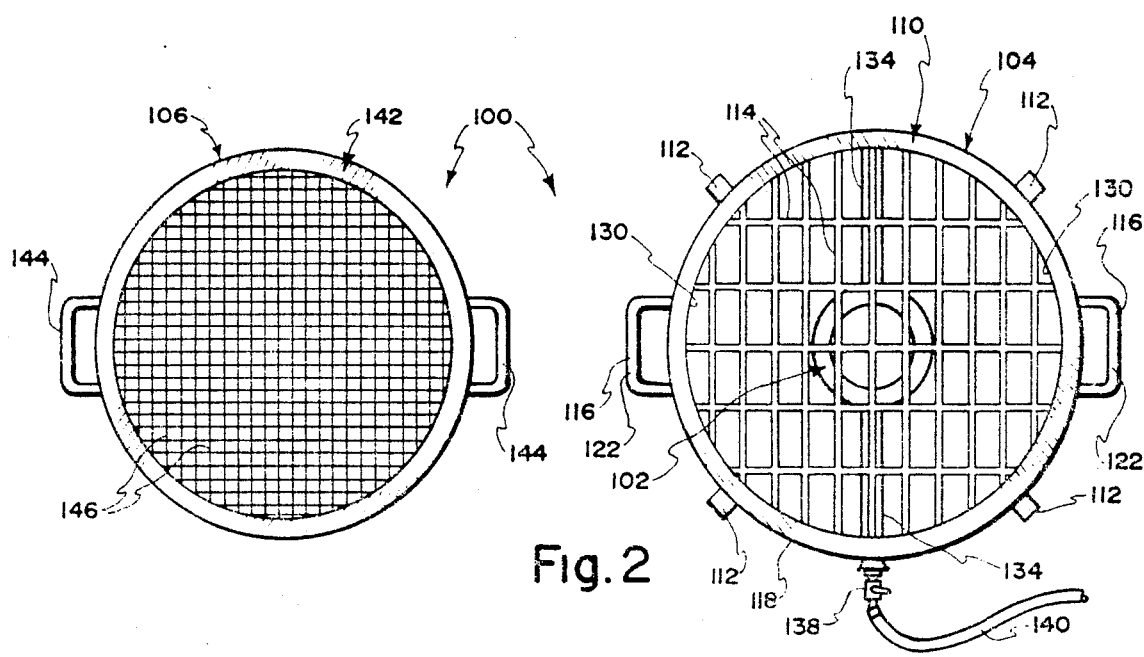
FIG. 2 is a plan view of both the charcoal containing hopper and propane burner containing hopper of FIG. 1.
Figure 5:
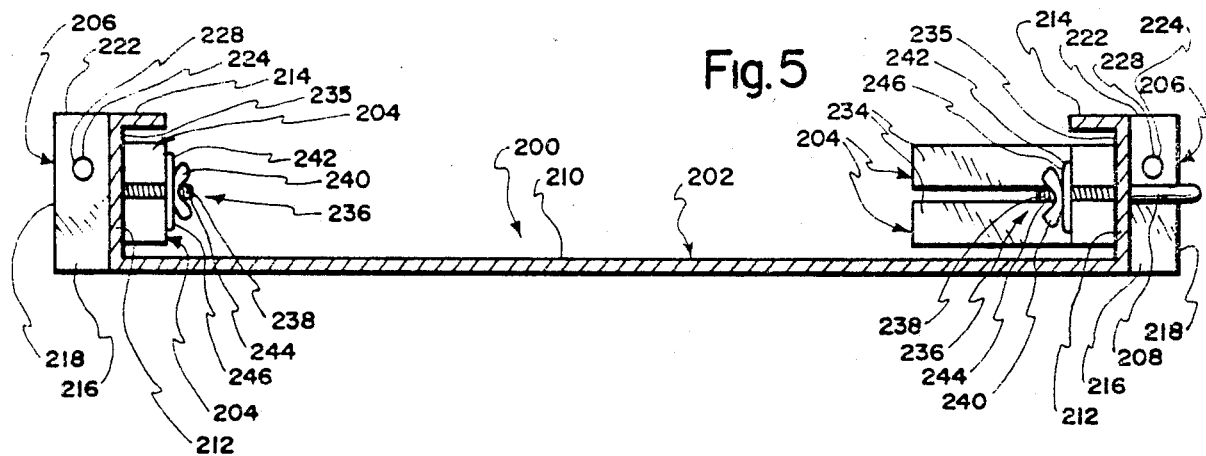
FIG. 5 is an enlarged cross-section taken along lines 5—5 of FIG. 4.
Figure 6:
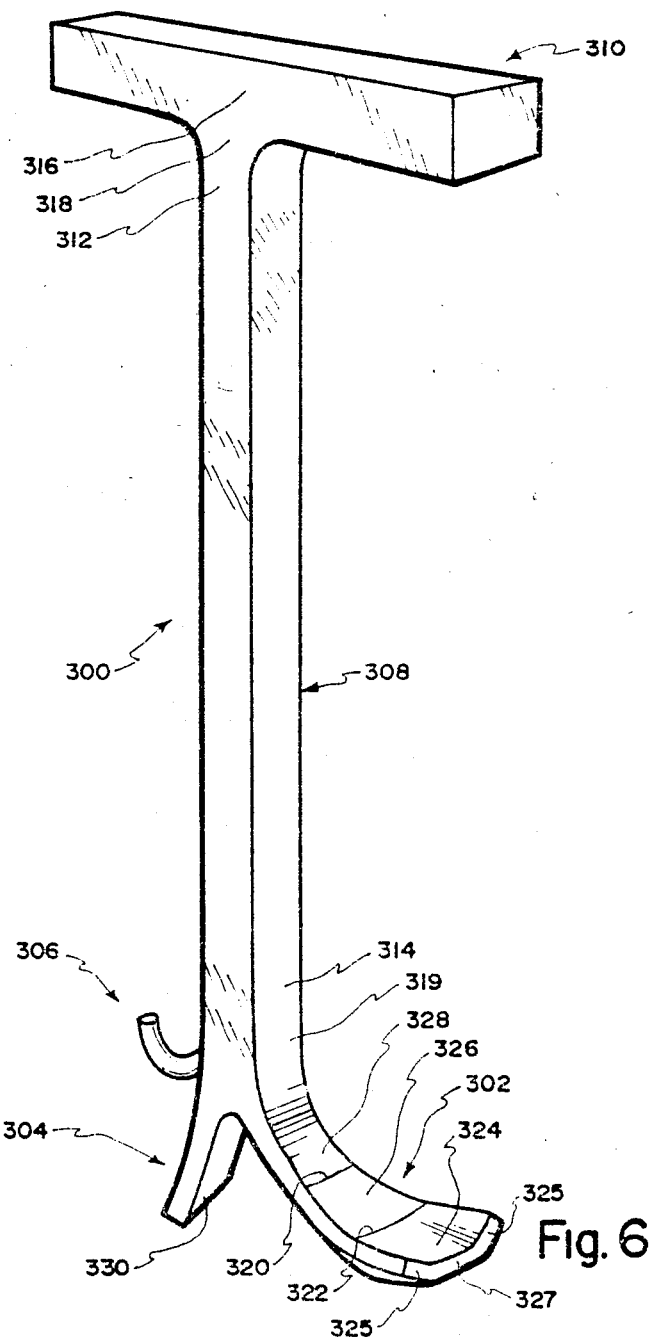
FIG. 6 is a perspective view of a dutch oven and dutch oven lid removal and replacement utensil, according to the present invention.
Figure 7:
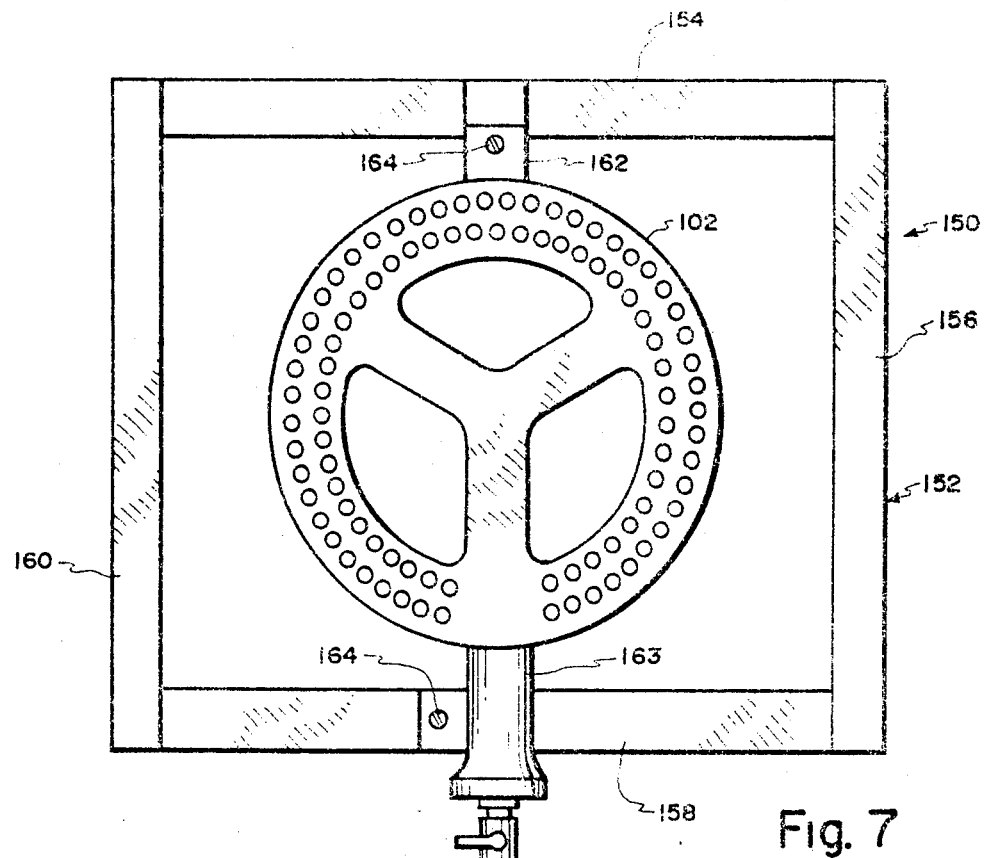
FIG. 7 is an enlarged partially cut away plan view of a second propane charcoal briquette starter unit, according to the present invention, illustrating a propane burner mounted on a square frame.
Figure 8:
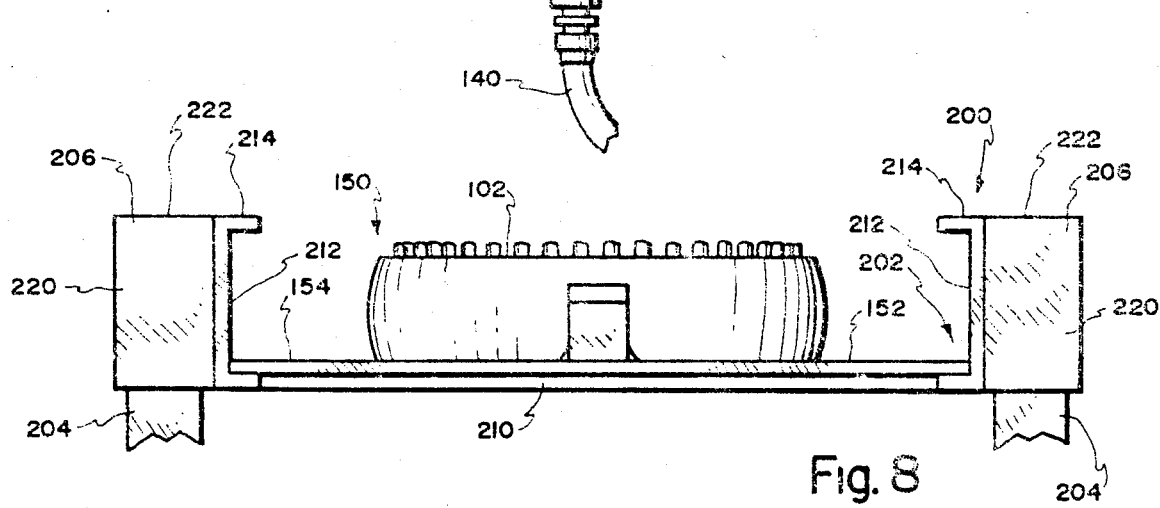
FIG. 8 is an enlarged cut away side view of the dutch oven cooking stand of FIG. 3 into which has been inserted the propane burner and frame of FIG. 7.

Specific reference is now made to the drawings in detail wherein like numerals are used to designate like parts throughout. More particularly, FIGS. 1 and 2 illustrate a propane-powered charcoal briquette starter unit, generally designated 100; FIGS. 3, 4, and 5 show a heavy-duty dutch oven cooking stand, generally designated 200; FIG. 6 illustrates a cooking utensil used to remove dutch ovens and dutch oven lids from a heating source, and to replace the same, generally designated 300; and FIGS. 7 and 8 show a second or alternative propane-powered charcoal briquette starter unit, generally designated 150. Each apparatus 100, 150, 200 and 300 is hereinafter described in greater detail. Taken together, apparatus 100, 150, 200 and 300 comprise a novel, safe and efficient method of outdoor cooking with dutch ovens, primarily when charcoal is used as the heat source.

Propane starter unit 100 comprises a standard, commercially available propane burner 102 which is securely attached to a support stand 104, a hopper 106 into which charcoal is placed, and a propane supply source 108. While the presently preferred propane burner 102 is Model No. 10-12RB available from Superb Hot Plate Co., 423 South Church Street, P.O. Box 99, Belleville, Illinois 62222, it is recognized that other makes and models of propane burners fall within the scope of the present invention. Support stand 104 further comprises a cylindrical body portion 110, four identical support legs 112, a heavy gauge screen 114, and two identical U-shaped handles 116.

The cylindrical body portion 110 of support stand 104 is open-ended, has preferred dimensions of twelve inches in depth and twelve inches in diameter, and is formed of medium gauge steel. Two U-shaped handles 116 of ⅜ inch cold rolled steel are attached, as by welding, to the exterior surface 118 of the cylinder 110, both being disposed at approximately mid-depth and at diametrically opposed locations. Only the open ends 120 of the handles 116, which are directed downwards, are attached to the cylinder 110, the closed end 122 being bent away from the cylinder 110 such that the handles 116 can readily be grasped without coming in contact therewith.

Four identical support legs 112 are also attached, as by welding, to the exterior surface 118 of cylinder 110. Each leg 112 has a length of sixteen inches, a cross-section of one inch square, and is formed of sixteen gauge steel, as presently preferred. The legs 112 are all disposed at equal intervals about the circumference of the cylinder 110. Approximately the upper half 124 of each leg 112 is attached, as described, to the cylinder 110, while the lower half 126 extends unsupported downwards so that the cylinder 110 sits at rest above the surface upon which it is supported. At about one-third of the overall distance up from the bottom edge 128 of the cylinder portion 110 is a heavy gauge steel mesh screen 114 which is permanently attached, as by welding, to the interior surface 130 thereof. The screen 114 thus spans the inside diametric area of the cylinder 110.

The propane burner 102 is connected to the bottom edge 128 of the cylindrical body portion 110 by means of a circular frame 132, which has a diameter equal to that of the cylinder 110 and is welded thereto. As illustrated, a straight bar 134, to which the burner 102 is securely attached, is connected to the circular frame 132 at two diametrically opposed locations by standard screws 136. The burner 102 is directed so as to heat the contents of the cylinder 110. A standard propane coupling unit 138, located beneath the burner 102, connects the burner 102 to a propane hose 140, which in turn is connected by standard means to a standard propane supply source 108.

The hopper 106 comprises a cylindrical body portion 142, two U-shaped handles 144, and a screen 146, all similar if not identical to corresponding components in the support stand 104. Cylinder 142 is identical to the cylindrical body portion 110 in construction, material and dimension, except that the diameter of cylinder 142 is slightly smaller such that it passes axially into the top open end of cylinder 110 without interference. The handles 144 are identical in all ways to the handles 116 located on cylinder 110 except that handles 144 are disposed at diametrically opposed locations at the top of the cylinder 142 rather than at the midpoint. As shown, handles 144 serve to prevent the hopper 106 from being completely enveloped by support stand 104 after insertion therein, since the diameter of cylinder 110 is not large enough to accommodate the handles 144. The screen 146 is comprised of medium gauge steel and is permanently attached, as by welding, to the bottom edge 148 of cylinder 142. Screen 146 thus spans the inside diametric area of cylinder 142.

Dutch oven cooking stand 200 comprises an elongated C-shaped tray 202, four legs 204 with corresponding leg sockets 206, and a handle 208 to assist in transportation. The stand 200 has an "as used" and an "as transported" or "as stored" position, both of which shall hereinafter be described in greater detail.

C-shaped tray 202 has a generally rectangular shape, and has completely open ends and top. It has preferred dimensions of approximately 40 inches in length, twelve inches in width, and three inches in depth. The tray 202 comprises a base portion 210, two wall or edge portions 212 at right angles to the base 210, and two lip portions 214 inwardly directed at right angles to walls 212 with a width of about one inch. In its preferred embodiment, tray 202 is formed from one continuous sheet of 11 gauge steel bent to the desired specifications.

The four leg sockets 206 are disposed and permanently attached, as by welding, one near each corner of the tray 202 on wall 212 so as to receive and support the legs 204, which are detachable. As shown, each leg socket 206 comprises three equidimensional rectilinear sides 216, 218, 220, a top cap or wall 222, and a tightening screw 224 with which to secure the detachable legs 204 into the "as used" position. Exterior side 220 is disposed approximately one inch from the open outside edge 226 of the tray 202. Each socket 206 has preferred dimensions of about one and ¼ inches square in cross-section and three inches in height, which is equal to the preferred depth of the tray 202. The interior side 216 contains an aperture 228 at its approximate center point, which is threaded such that tightening screw 224 can be freely rotated by hand. As mentioned, when the legs 204 are inserted into the leg sockets 206, in anticipation of using the cooking stand 200 for its intended purpose, the tightening screw 224 is rotated by hand as far as possible, thus locking the legs 204 into a position where they elevate and support the tray 202 at a convenient height for cooking purposes. To disassemble and either transport or store the cooking stand 200, the screw 224 is loosened, and the legs 204 are removed and conveniently fastened to the interior of the tray 202, as hereinafter more fully described.

Each leg 204 is essentially identically L-shaped, is one inch square in cross-section in the preferred embodiment and has a height of about twenty-four inches. Preferred legs 204 are formed of 16 gauge steel. While the top end 230 of each leg 204 is inserted into a leg socket 206 during use as previously explained, the lower end 232 of each leg 204 comprises a stabilizing foot 234 approximately five inches long. The foot 234 is joined to the leg 204 by welding at right angels thereto, the foot 234 extending outward from the stand 200 in the "as used" position. Each leg 204 and foot 234 combined as one unit form an L-shape.

Upon detachment of the legs 204 from the tray 202, described above, for storage or transportation purposes, two legs 204 are stacked on top of each other at both interior sides 235 of the tray 202, and thus are enclosed on three sides by the tray's base 210, the walls 212 and the lips 214. The legs 204 are secured in this stacked position at each side 235 by a leg fastening unit 236, which comprises a threaded shaft 238 of about one and ¼ inches in length, a wing nut 240 which accommodates the shaft 238, and a retainer plate 242. A shaft 238 is both longitudinally and transversely centered on each of the tray walls 212 and permanently attached on one end, as by welding, thereto such that the free end 244 of the shaft 238 is directed towards the interior of the tray 202. The retainer plate 242, a generally flat, rectangular member, contains an aperture 246 large enough to accommodate the shaft 238 at its approximate center point. The plate 242 has a length less than the depth of the tray 202 but greater than the width of a leg 204; thus, in the presently preferred embodiment, the retainer plate 242 has a length between one and three inches. In order to secure the legs 204 in the "as stored" or "as transported" positions, the retainer plate 242 is placed over the threaded shaft 238 such that the shaft 238 protrudes through the aperture 246. The wing nut 240 is then placed over the shaft 238 and rotatably tightened clockwise by hand to securely fasten the legs 204 in place.

Handle 208 is permanently attached, as by welding, to the exterior of either side wall 212 and serves as a convenience during transportation. The handle 208 is formed, at present preference, of ⅜ inch cold rolled steel into a U-shape, and is positioned on a wall 212 such that the weight of the cooking stand 200 is evenly distributed upon lifting by the handle 208.

Alternative propane starter unit 150 comprises (a) the flat propane burner 102, which is securely attached to a flat square steel frame 152, (b) the charcoal hopper 106 and (c) the propane supply source 108. The frame 152 is preferably formed of four 1"×¼" steel strips 154, 156, 158 and 160 welded together at the ends into a single square unit. Square frame 152 has preferred sides of approximately ten inches so that it slides snugly between channel members 212 of the stand 202 at one end thereof. As illustrated in FIG. 7, a straight steel bar 162, to which the burner 102 is securely attached, is connected to the square frame 152 at the approximate midpoints of two opposed sides 154 and 158 thereof by standard screws 164 and 166. All other features of alternative propane starter unit 150 are identical to those described above in connection with starter unit 100.

Alternative unit 150 is operated by placing the square frame 152 and attached burner 102 into the C-shaped tray 202 of the cooking stand 200 such that, when ignited, the flame emanating from the burner 102 is directed upwards. After igniting the flame, the hopper 106 filled with charcoal briquettes is placed above the cooking stand 200 so as to straddle the burner 102. In this manner the briquettes are directly exposed to an open flame for preheating purposes similar to the initial method described above. The vertical dimension of basket 106 when used with the burner configuration of FIGS. 7 and 8 may be relatively small. In addition, the ignited burner 102 may be used as a cooking source, e.g. by straddling the channel members 212 over the burner 102 with a cooking instrument.

The lid and oven utensil 300 comprises a lid handle engaging toe section 302, a lid stabilizing heel section 304, a lifting bail engaging hook 306, an elongated upright shaft 308, and a handle 310. As presently preferred, the shaft 308 is formed of ¼ inch square hollow steel stock, has a length of about seven inches and comprises an upper portion 312 and a lower portion 314.

The handle 310 is located at the upper portion 312 of the shaft 308 and is attached, as by welding, at right angles at its midlength 316 to the top end 318 of the shaft 308. Thus, shaft 308 and handle 310 form a T at their point of attachment. In the preferred embodiment the handle 310 is approximately five inches long for facile gripping.

Toe section 302, heel section 304 and hook 306 are located at the lower portion 312 of the shaft 308. The toe 302 is preferably made of flat steel stock and has an approximate length of three inches. The width of the toe 302 is divergently enlarged in the direction of the distal end. It is attached by welding to the bottom end 319 of shaft 308 so as to be coplanar with the major plane formed by shaft 308 and handle 310. Toe section 302 is formed by bending the material into a relatively uniform curved surface in the axial direction. Two accentuated points of bending 320 and 322, however, form three distinct sections 324, 326 and 328 of the toe 302. The corner 325 at the distal end 327 are curled slightly upward to improve the resistance of the lid lifter 300 against inadvertent separation from a lid being lifted. When toe 302 is inserted under the dutch oven lid handle, the forward section 324 passes under the handle, the middle section 326 engages the handle and the shaft section 328 prevents displacement.

The heel section 304 is also made from flat steel stock, but is essentially straight in contrast to the toe section 302. As with the toe 302, the heel 304 is welded to the bottom end 319 of the shaft 308. Heel 304 has a length of about one and ¼ inches and is disposed such that when the shaft 308 is in the vertical position its lower end 330 is at a higher elevation than the forward section 324 of the toe 302. This orientation allows proper coordination between the toe 302 and heel 304 for safe and efficient removal of the dutch oven lid.

Directly above the heal section 304 on the lower portion 314, the bail engaging hook 306 is welded to the shaft 308. The hook 306 has a standard U-shape and facilitates lifting of the entire dutch oven by engagement of the hook 306 with the dutch oven's bail or handle.

In its presently preferred embodiment, the propane starter unit 100, the cooking stand 200 and the cooking utensil 300 are coated with a high heat resistant black paint to ensure against heat damage.

The invention may be embodied in other specific forms without department from the spirit or essential characteristics thereof. The present embodiment, is, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. Self-contained fuel igniting apparatus comprising two separable units, the first separable unit comprising a source of flowable fuel, burner means in communication with the fuel source and comprising volatile fuel dispensing means by which a continuous controlled open flame is sustained, and support means with which the fuel dispensing means of the burner means are associated and means which define an open access to said flame;

the second separable unit transportable basket means comprising porous bottom means into which charcoal articles to be ignited and oxidized are placed and held in contact with the flame during ignition and initial oxidation of the charcoal articles;

the second separable unit comprising discharge means for placing the ignited charcoal at a first cooking site and the means which define an open access to said flame of first separable unit being such as to accommodate cooking with the first separable unit at a second cooking site after separation of the second separable unit from the first separable unit.

2. Self-contained fuel igniting apparatus according to claim 1 wherein the flowable volatile fuel comprises a gaseous hydrocarbon.

3. Self-contained fuel igniting apparatus according to claim 1 wherein the transportable basket means comprises hopper means separate and distinct from but selectively releasibly associated with the support means.

4. Self-contained fuel igniting apparatus according to claim 3 wherein the hopper means comprise a cylinder having an open top end and a bottom end covered with a mesh material.

5. Self-contained fuel igniting apparatus according to claim 1 wherein the charcoal articles comprise briquettes.

6. Self-contained fuel igniting apparatus according to claim 1 wherein the apparatus comprises surface means comprising high heat resistant black paint.

7. Self-contained fuel igniting apparatus according to claim 1 wherein the burner means comprise control means whereby provision of said flowable volatile fuel to said burner means may be manually terminated, commenced and adjusted.

8. Self-contained fuel igniting apparatus according to claim 1 wherein the support means comprise exposed manual handle means.

9. Self-contained fuel igniting apparatus according to claim 1 wherein the basket means comprise exposed manual handle means.

10. Self-contained fuel igniting apparatus according to claim 1 wherein the support means comprise means defining a hollow interior into which the basket means removably fit.

11. An outdoor dutch oven one-piece cooking handle for one-handed use comprising a proximal end, a distal end and linear elongated means connecting the two ends:

the distal end comprising divergent bifurcated toe means and heel means, the toe and heel means at the bifurcation each forming an included angle with the axis of the shaft means which is substantially less than 90°;

the toe means comprising first relatively short continuously curved rigid heat resistant means capable of engaging, for lifting purposes, a conventional dutch oven lid loop in male/female relationship;

the heel means bifurcated from the toe means comprising second relatively short generally straight rigid heat resistant means to engage the top surface of and stabilize the dutch oven lid as said lid is lifted at the lid loop by the toe means;

the proximal end comprising manual grasping means whereby the cooking handle is easily and firmly grasped for lifting purposes.

12. An outdoor cooking handle according to claim 11 wherein said handle comprises a coating of high heat resistant black paint.

13. An outdoor cooking handle according to claim 11 further comprising hooking means attached to the shaft means adjacent the heel means and the toe means, said hooking means serving to selectively engage bail means of the dutch oven for one hand lifting purposes.

14. A portable outdoor cooking apparatus usable for dutch oven cooking, comprising:

open-ended top tray means having a generally U-shaped cross-section defining substantially unobstructed open air recess means above floor wall means between spaced vertically extending side wall means into which independent charcoal articles and the like are placed, the tray means being sized to accommodate simultaneous cooking placement at the unobstructed open top of a plurality of separate cooking instruments, the open end accommodating rectilinear translation of a volatile fuel heat source through the open end into the recess means;

ground engaging spaced vertically directed leg means joined to the tray means adjacent the top of each leg means thereby supporting the tray means at an elevation substantially above the ground.

15. A portable outdoor cooking apparatus according to claim 14 wherein the cooking instruments comprise at least one dutch oven.

16. A portable outdoor cooking apparatus according to claim 14 wherein the open top tray means are provided with handle means to facilitate transportation.

17. A portable outdoor cooking apparatus according to claim 14 wherein the leg means comprise ground engaging foot means for increased stability.

18. A portable outdoor cooking apparatus according to claim 14 wherein the leg means are detachable connected to the upper ends thereof to accommodate disassembly for ease of transportation and storage.

19. A portable outdoor cooking apparatus according to claim 18 wherein the leg means are detachably attached by set screw means.

20. A portable outdoor cooking apparatus according to claim 14 wherein the apparatus comprises surface means comprising high heat resistant paint.

21. A cooking system comprising:
a charcoal starting apparatus, a cooking stand and a separate handle for manual movement of a cooking utensil and a lid therefor;
the charcoal starting apparatus comprising a source of flowable fuel, burner apparatus selectively receiving the fuel and burning the same as an open exposed flame and basket means comprising a porous bottom upon which charcoal articles are placed to start the same;
the cooking stand comprising an open ended elevated hot charcoal-receiving trough detachably mounted upon spaced vertically-directed ground engaging legs;
the handle comprising proximal end means for manual grasping, and distal trifurcated end means comprising means by which bail means of a cooking utensil are engaged for lifting purposes, means for lifting the loop of lid means of the cooking utensil and means stabilizing the lid means during lifting.

22. A method of outdoor cooking comprising the steps of:
igniting separate burner means using flowable fuel so that a continuous controlled open flame is created;
placing charcoal fuel means into basket means such that the open flame of the separate burner means comes into direct contact with the charcoal fuel means through a porous bottom of the basket means whereby the charcoal fuel means are started and become an independent heat source;
separating the separate burner means and the basket means from the vicinity of each other;
erecting an elevated trough upon detachable legs for waist high use;
displacing the burning charcoal fuel means from the basket means into the elevated trough which simultaneously accommodates a plurality of cooking instruments, with the separate burner means being disposed at a remote location;
placing and removing as needed the cooking instruments onto and from the elevated trough by one hand use of handle means.

23. A portable outdoor cooking apparatus, comprising:
open-ended top tray means having a generally trough-shaped cross-section defining cavity means between front and back wall means;
a source of flowable fuel;
burner means comprising means in communication with the fuel source and comprising fuel dispensing means by which a continuous controlled open flame is sustained, the burner means comprising frame means sized and shaped to be received in the trough of the tray means;
transportable basket means comprising porous bottom means into which charcoal articles to be ignited and oxidized are placed and held over the burner means in contact with the flame during ignition and initial oxidation.

24. A portable outdoor dutch oven cooking apparatus usable for dutch oven cooking, comprising:
top trough-shaped elongated non-foldable tray means defining a substantially unobstructed open top through which dutch oven and other cooking instruments can be placed into contiguous relationship with ignited charcoal articles in use, the tray means comprising substantially uninterrupted generally rectangular floor wall means comprising a top surface upon which the charcoal articles and the like are placed, the tray means further comprising substantially uninterrupted parallel spaced vertically extending substantially planar side wall means, the tray means being sized to accommodate simultaneous placement and removal of a plurality of separate cooking instruments upon and from contiguous relation with the ignited charcoal articles through the unobstructed open top;
ground engaging spaced vertically directed leg means joined to the tray means supporting the tray means at an elevation substantially above the ground.

* * * * *